United States Patent [19]

Martin et al.

[11] Patent Number: 4,871,711
[45] Date of Patent: Oct. 3, 1989

[54] ACTIVE MATERIAL PRODUCED FROM METAL OXIDE/HYDROXIDE PARTICLES AND PHOSPHATE ESTERS

[75] Inventors: Edward S. Martin, New Kensington; Larry F. Wieserman, Apollo, both of Pa.

[73] Assignee: Aluminum Company of America, Pittsburgh, Pa.

[21] Appl. No.: 23,312

[22] Filed: Mar. 9, 1987

Related U.S. Application Data

[63] Continuation-in-part of Ser. No. 946,870, Dec. 29, 1986, abandoned.

[51] Int. Cl.$^4$ .................. B01J 20/08; B01J 20/22; B01D 15/08; B32B 9/00
[52] U.S. Cl. ........................... 502/415; 55/67; 210/198.2; 210/198.3; 210/656; 427/212; 428/403; 428/404; 428/406; 435/176; 502/7; 502/162; 502/401; 502/407
[58] Field of Search ............. 502/7, 401, 162, 415; 210/198.2, 198.3, 656; 55/67, 386; 427/212; 428/403, 404, 406

[56] References Cited

U.S. PATENT DOCUMENTS

| | | | |
|---|---|---|---|
| 3,013,904 | 12/1961 | Cupery | 428/242 |
| 4,123,931 | 11/1978 | Blaser | 55/67 |
| 4,183,843 | 1/1980 | Koenig et al. | 523/216 |
| 4,202,798 | 5/1980 | Johnson et al. | 208/216 PP |
| 4,251,350 | 2/1981 | Johnson et al. | 208/216 R |
| 4,308,079 | 12/1981 | Venables et al. | 428/414 |
| 4,382,016 | 5/1983 | Rickelton et al. | 252/428 |
| 4,786,628 | 11/1988 | Wieserman et al. | 502/401 |
| 4,788,176 | 11/1988 | Wieserman et al. | 502/401 |

OTHER PUBLICATIONS

"Selective Retention of Organic Phosphate Esters & Phosphonates on Aluminum Oxide", Coletti–Previero et al., *Bioscience Reports*–vol. 6, No. 5, 1986–pp. 477–483.

"The Adsorption of Di–n–butylphoshate on Alumina from Organic Solutions on Some Metal Oxides", Gal et al., *J. Inorg. Nucl. Chem.*–vol. 25, 1963, pp. 129 and 130.

*Primary Examiner*—Paul E. Konopka
*Attorney, Agent, or Firm*—Andrew Alexander; John P. Taylor

[57] ABSTRACT

An active material is disclosed comprising metal oxide/hydroxide particles having chemically bonded to reactive sites on a surface thereof, a monolayer of a phosphorous-containing organic material comprised of a phosphorous-containing group and a carbon-containing group. The bond to the metal oxide/hydroxide particle surface is formed by reaction of the phosphorous-containing group with the metal oxide/hydroxide particle surface, so that the carbon-containing group of the material is oriented away from the metal oxide/hydroxide surface.

38 Claims, 1 Drawing Sheet

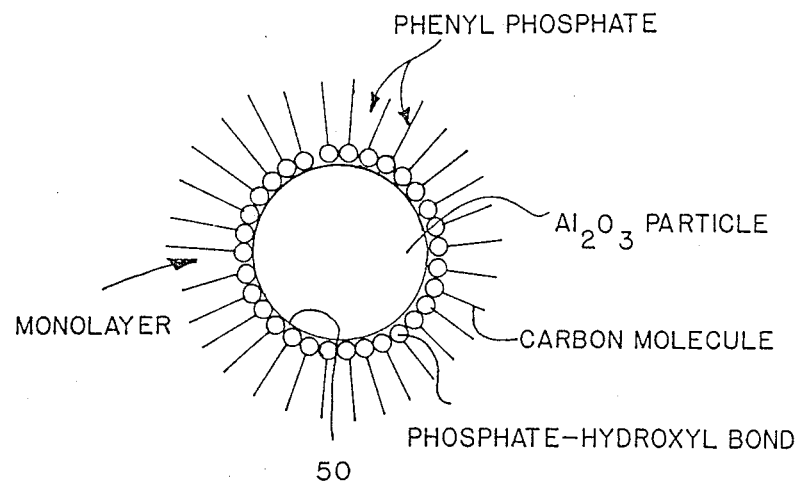

ACTIVE MATERIAL PRODUCED FROM METAL OXIDE/HYDROXIDE PARTICLES AND PHOSPHATE ESTERS

CROSS REFERENCE TO RELATED APPLICATIONS

This application is a continuation-in-part of U.S. Ser. No. 946,870, filed Dec. 29, 1986, now abandoned.

BACKGROUND OF THE INVENTION

1. Field of the Invention

This invention relates to the product of the reaction of metal oxide/hydroxide particles with a monolayer of one or more phosphorous-containing organic materials having selected reactive sites thereon to form an active material useful as an adsorbant.

2. Description of the Related Art

Analytical and industrial adsorbents made from organic resins suffer from poor physical strength, poor thermal stability, high cost, solvent swelling, and low capacity. Adsorbents made from metal oxides such as silica exhibit poor chemical stability at high pH. For many applications, in particular for high pressure and large separation columns, an adsorbent with high physical integrity, good chemical stability over high and low pH conditions, specific surface functionalities, good thermal stability, and low cost is needed for a wide range of applications.

Other metal oxides such as alumina have also been used as adsorbents because of the good physical integrity and low cost of alumina. The solubility of alumina in pH ranges between 4 and 9 is very low and the material is, therefore, chemically and physically stable in this pH range. However, beyond this pH range, on either the basic or acidic side, alumina becomes soluble in aqueous media and its physical strength and integrity degrades rapidly.

Modifications of metal oxide absorbents such as alumina and aluminosilicates have been proposed. Stockel U.S. Pat. No. 4,506,628 teaches the formation of an absorbent animal litter utilizing alumina, aluminosilicates, or coal residues as the substrate intimately mixed with monomers containing acid functionalities which polymerize in situ. the monomer, such as vinyl phosphonic acid, together with a redox catalyst, is mixed with a pliable dough formed from alumina and water and extruded into pellets which harden as the monomer polymerizes.

Modified alumina has also been used in the formation of catalysts. Johnson et al U.S. Pat. Nos. 4,202,798 and 4,251,350 describe the formation of a hydrocarbon hydrotreating catalyst formed by contacting alumina with a phosphorous-containing acid compound such as phenylphosphonic acid and then calcining the phosphorous-containing hydrous alumina. The calcined alumina is then treated with at least one metal-containing compound and again calcined to form the catalyst product.

In addition, Cupery U.S. Pat. No. 3,013,904 discloses a substrate having an organic polymer containing pentavalent phosphorus bonded thereto. Coatings of phosphorous-containing organic polymers are applied over coatings of positively charged colloidal metal oxides applied to negatively charged substrates. the thickness of the combined colloidal oxide and polymer layers on a substrate is less than 100 millimicrons.

Venables et al U.S. Pat. No. 4,308,079 teaches the treatment of an aluminum oxide surface of a aluminum substrate with a monomolecular layer of an amino phosphonate compound such as nitrilotris (methylene) triphosphonic acid to retard hydration of the aluminum oxide to aluminum hydroxide to provide a more stable microporous surface which is particularly suited to commercial adhesives. The presence of the hydrated oxide is said to interfere with the formation of a satisfactory bond between the adhesive and the oxide, while the phosphonate treatment is said to inhibit the conversion of the oxide to hydroxide without interfering with subsequent bonding of the adhesive to the oxide.

SUMMARY OF THE INVENTION

An active material is provided comprising a metal oxide/hydroxide particle having chemically bonded to reactive sites on the surface thereof a monomolecular layer of one or more types of phosphorous-containing organic molecules. The organic molecule is comprised of a phosphorous-containing group capable of forming a chemical bond with the reactive sites on the metal oxide/hydroxide particle and a carbon-containing group or site oriented away from the surface of the metal oxide/hydroxide particle and capable of functioning as the active component or site of the molecule.

It is, therefore, an object of this invention to provide an active material suitable for use as an adsorbent comprising one or more types of phosphorous-containing organic molecules bonded to the surface of a metal oxide/hydroxide particle.

It is another object of this invention to provide an active material suitable for use as an adsorbent stable at extended pH ranges and insoluble in aqueous media ranges comprising a monomolecular layer of one or more types of phosphorous-containing organic molecules bonded to the surface of a metal oxide/hydroxide particle.

It is yet another object of this invention to provide an active material suitable for use as an adsorbent stable at extended pH ranges of from 2 to 11 and insoluble in aqueous media ranges comprising a monomolecular layer of one or more types of phosphorous-containing organic molecules chemically bonded to the surface of a metal oxide/hydroxide particle wherein each of the organic molecules is further comprised of a carbon-containing group oriented away from the surface of the metal oxide/hydroxide particle and capable of functioning as the active component of the molecule.

It is a further object of this invention to provide an active material suitable for use as an adsorbent stable at extended pH ranges of from 2 to 11 and insoluble in aqueous media ranges comprising a monomolecular layer of one or more types of phosphorous-containing organic molecules wherein the phosphorouscontaining group on the molecule is chemically bonded to the surface of a metal oxide/hydroxide particle and the molecule is further comprised of a carbon-containing group oriented away from the surface of the metal oxide/hydroxide particle and capable of functioning as the active component of the molecule.

It is yet a further object of this invention to provide a process for making such an active material suitable for use as an adsorbent which comprises chemically bonding to the surface of a metal oxide/hydroxide particle a monomolecular layer of one or more types of phosphorous-containing organic molecules wherein each of the organic molecules is further comprised of a carbon-containing group oriented away from the surface of the metal oxide/hydroxide particle and capable of functioning as the active component of the molecule.

It is a further object of this invention to provide a process of making such an active material suitable for use as an adsorbent stable at extended pH ranges and insoluble in aqueous media.

It is another object of this invention to provide a process for making such an active material suitable for use as an adsorbent stable at pH ranges of from 2 to 11.

It is yet another object of this invention to provide a process for making an active material suitable for use as an adsorbent stable at pH ranges of from 2 to 11 by treatment of the surface of a metal oxide/hydroxide particle with an organic phosphoric acid monoester or phosphoric acid diester, organic thiophosphates or organic phosphoramidates in an amount sufficient to form a monomolecular layer on the metal oxide/hydroxide particle and to render the metal oxide/hydroxide particle insoluble in an aqueous media.

These and other objects of this invention will be obvious from the following description and accompanying drawings.

BRIEF DESCRIPTION OF THE DRAWING

The FIGURE is an illustration of a metal oxide/hydroxide particle having a monolayer of phosphorous-containing material thereon.

DETAILED DESCRIPTION OF THE INVENTION

In accordance with the invention, the active material comprises a metal oxide/hydroxide particle having chemically bonded thereto a substantially monomolecular layer of a phosphorous-containing organic material wherein the organic molecule having the phosphorous-containing group is further comprised of a carbon-containing group oriented away from the surface of the metal oxide/hydroxide particle and capable of functioning as the active component of the molecule. This active material is suitable for use as an adsorbent which is stable over a large pH range, i.e., from 2 to 11, and which, unlike at least some of the metal oxide/hydroxides useful as the support material, is insoluble in aqueous media.

The active material also may be useful for: an analytical and prepative-scale chromatographic support; an ion exchange media; a coupling agent for biological materials such as enzymes, whole cells, yeasts, proteins, microbes, pharmaceuticals including timed-release drugs, and vaccines; stabilization of inorganic membranes used at high and low pH; coatings for piezoelectric crystals; spacer molecules for holding metal oxide particles apart; coatings for fillers and flame-retardants in polymers; coatings for inhibiting cation or anion adsorption (such as $F^-$ adsorption on alumina); formation of hydrophobic surfaces on metal oxides to control wetting and dispersion properties in fluid media; controlling surface charge in fluid media; promoters for adhesive bonding, ceramics, and polymers; coupling agents for immobilizing optically active molecules (chirality) for selective adsorption of optically active compounds (d or l isomers); surface modification for passivating surfaces of biological implants (e.g., bones, joints, teeth); additives to medicinal products (extenders, coloring agents, flavorings for toothpaste, creams); improve bonding beteen electrical insulation and a metal conductor (decrease delamination from weathering); controlling the abrasive properties of metal oxides powders; complexing agents for catalytically active metals for improved metal dispersion; producing stain and wear resistant coatings for plastic, concrete, or soft metal wear surfaces; selective adsorbing of toxic liquids or gases without adsorbing water; coupling agent for coloring polymers and paints; preservative coatings for natural products such as wood, straw, and stone to increase surface hardness, stain resistance, and color fastness; coating to increase the efficiency of photon radiation by enhanced absorption and/or light scattering; coating with bacteriostatic properties for pharmaceutical products, treating fabrics, and wood (e.g., treating wood shingles to inhibit formation of mold, mildew, and rot); flocculating agents for colloidal dispersions; metal chelating agents; and additive to polish and waxes as extender and anti-wetting agent. Further, the active material also may be useful in diagnostic testing devices or processes or in therapeutic devices or processes. The active material may be applied to membranes such as inorganic membranes and may be used in reverse osmosis dialysis and ultrafiltration.

The use of the term "active material" is intended to define an organic molecule comprising a monomer, oligomer or short chain polymer having a phosphorous-containing group, preferably at the end of the molecule, capable of bonding to the metal oxide/hydroxide support and having one or more sites thereon, preferably at the opposite end of the molecule, which may be used for the coupling, bonding, or adsorbing, etc. of atoms, ions or other molecules thereto, e.g., when the active material functions as an adsorbent, the active material will have sites available on the molecule to which the material to be adsorbed will be attracted.

The use of the term "metal oxide/hydroxides" herein is intended to define a broad spectrum of oxides ranging from those which may contain few hydroxides, e.g., activated forms of aluminum oxide (alumina) to more hydrated forms which may comprise mainly hydroxide, e.g., $Al(OH)_3$. It has been found, however, that the metal hydroxide form, rather than the metal oxide form, provides a better bond with the phosphorous-containing group on the organic molecule with which it is reacted. However, for certain applications, dehydrated or activated forms of the metal oxide/hydroxide may be preferred due to the higher surface area of such particles. For example, when aluminum oxide/hydroxide is used, the hydrated form will be preferred, e.g., gibbsite, bayerite, or boehmite will be preferred when a large external surface area is desired and activated alumina will be preferred when it is desirous that the metal oxide/hydroxide have a high internal surface area.

As presently understood, the metal oxide/hydroxides suitable for use in the present invention usually require hydroxyl groups on the surface thereof for purposes of providing bonding sites for the phosphorous-containing organic materials. For example, when the particulate material is alumina, hydroxyl groups on the surface of the alumina react with the phosphorous-containing group or groups of the organic molecule, i.e., with the —PO(OH) group of the phosphoric acid monoester or the phosphoric acid diester or organic phosphoramidates or organic thiophosphates. When using an organic solvent, particularly where the solvent is immiscible with water, a monolayer of hydroxyl groups are provided on the alumina particles for purposes of reacting to form a chemical bond with the phosphoric acid group(s) of a phosphoric acid mono or diester. It will be appreciated that if more than a monolayer of hydroxyl units are present on the alumina surface, such as hydroxyl units present as a result of water, this additional water layer can act to hinder the reaction. Thus, while it is preferred to have a maximum of a monolayer of hydroxyl units, less than a complete surface layer of hydroxyl units can be present on the metal oxide and such does not hinder reactivity.

Metal oxide/hydroxides which may be used as the support particle for reaction with the phosphorous-containing organic material include any metal capable of forming oxide/hydroxide selected from the class consisting of groups IB, IIA, IIB, IIIA, IVA, VA, IIIB, IVB, VB, VIB, VIIB and VIII, and combinations thereof. For example, the oxide/hydroxides of aluminum, magnesium, titanium, zirconium, iron, silicon, chromium, zinc, vanadium, and combinations of these may be used. Also, a core or center of iron oxide/hydroxide or other paramagnetic or diamagnetic material may be used with a coating of a metal compound to take advantage of the magnetic properties of of the iron oxide/hydroxide as an adsorbent. It should be noted that by use of the term "metal", it is intended to include not only the traditional metals, but also materials sometimes referred to as metalloids such has Si, Se, B, As and Te and to exclude the remaining elements referred to as nonmetals in the periodic table. In addition, oxides/hydroxides of the lanthanide series, as well as oxides/hydroxides of thorium and uranium in the actinide series, may be used as the support particle.

While the invention is primarily directed to the use of metal oxide/hydroxide particles as support materials for reaction with the phosphorous-containing organic molecules to form the active material, it is within the purview of this invention that other metal compounds could be used in substitution for the metal oxide/hydroxides such as metal silicates, oxalates, phosphates, sulfates, carbonates, apatites, hydrotalcites, zeolites, kaolin, clays and chromates as well as combinations of such materials or combinations of any of such materials with the preferred metal oxide/hydroxide support materials.

With respect to the metal oxide/hydroxides used in the present invention, it is preferred that they are provided in particulate form for certain applications. When the use is adsorbents, particle sizes can range from as low as 50 Angstroms to provide large external surfaces and up to 12 millimeters for large reactors. When the adsorbent base is alumina the particle size can be 1 to 200 microns. It will be appreciated that other uses, for example, flocculation, flame retardant in polymers, heterogeneous catalyst, can require different particle sizes. However, normally for adsorbent use, the particle size is greater than 1 micron. Typical particle size distributions, when the metal oxide/hydroxide particles comprises aluminum oxide/hydroxide (alumina), are 1, 3–6, 7–12, 10–18, 18–32, 32–63, and 50–200 microns.

With respect to particle size morphology of the metal oxide/hydroxides used in the invention, e.g., metal oxide/hydroxides such as alumina, or iron oxide, for purposes of the present invention, it is preferred that they have a pore size of 20 Angstroms to 10 microns in diameter. Further, it is preferred that the particles have a pore volume of 0.1 to 1.5 ml/g. With respect to purity, the level of impurity should be minimized depending on the end use. However, for adsorbents, for example, the metal oxide or metal compound should have a purity level of over 80%, preferably 95% or greater. Surface area of the particle is preferred to be high with typical surface areas for alumina, for example, being in the range of 0.10 to 600 $m^2/g$ and up to 1000 $m^2/g$ for other metal oxide/hydroxides such as silica.

To produce the active material comprising the metal oxide/hydroxide reacted with one or more types of phosphorous-containing organic molecules, the metal oxide/hydroxide, such as alumina, may be reacted with a phosphoric acid monoester or a phosphoric acid diester in a hydrocarbon solvent at a temperature of from about 25° C. up to about 90° C., preferably about 50° C., for a period of from at least 0.1 to not more than 20 hours, and preferably from at least about 0.5 hours up to about 4 hours, using an initial acid concentration of at least about 0.0001 to 0.5 molar. In some instances higher concentrations may be desired. When the media is non-aqueous, the temperature range can be greatly extended. For example, it may range from 5° C. or lower to 200° C. or sometimes higher depending on the liquid media.

In the present invention, the weight of the monolayer can range from about 1 to 75 wt. % calculated on the total weight of the coated metal oxide, and preferably the monolayer can range from about 4 to 50 wt. %, typically 5 to 20 wt. %. For purposes of ensuring that a monolayer of phosphonated organic material is bonded to the metal oxide particles, the application should be carefully controlled. That is, a monolayer can be obtained, for example, by controlling the viscosity of the aqueous media, the time of exposure in the media, the concentration of phosphorouscontaining organic material in the media, or the concentration of hydroxyl units on the metal oxide particles. In addition, to ensure a monolayer, after formation of the active material, it may be treated in either a basic or acidic solution, or both, e.g., a $NaHCO_3/Na_2CO_3$ washing solution having a pH of about 10, to remove weakly adsorbed molecules on the particles. This ensures that all of the molecules remaining are bonded to the hydroxyl groups on the metal oxide/hydroxide surface and not to one another, thus assuring formation of the desired monomolecular layer stable over a wide range of pH.

The formulas for the phosphoric acid esters useful in the practice of the invention may be written as $(RO)PO(OH)_2$ (phosphoric acid monoester or monophosphate) while the phosphoric acid diester may be written as $(RO)(R'O)PO(OH)$, R and R' may be organic groups containing 1 to 30 carbon atoms, preferably 5–30, carbon-containing molecules such as an alkyl group. Other examples of groups which may comprise R and/or R' include long and short chain aliphatic hydrocarbons, aromatic hydrocarbons, carboxylic acids, aldehydes, ketones, amines, amides, thioamides, imides, lactams, anilines, pyridines, piperidines, anhydrides, carbohydrates, thiocyanates, esters, lactones, ethers, alkenes, alkynes, alcohols, nitriles, oximes, organosilicones, sulfur containing organic compounds, ureas, thioureas, perfluoro organic molecules, perchloro organic molecules, perbromo organic molecules and combinations of these groups.

The phosphorous-containing organic molecules such as listed above may also include inorganic groups substituted thereon such as halogens, nitrates, phosphates, phosphinates, phosphinites, phosphonates, quaternary ammonium salts, and the like. While it is preferred that the free end of the organic group extends away from the surface of the metal compound particle, it is within the scope of the present invention to provide, on the free end of the molecule, one or more functional groups. A functional group may be defined as the group on the molecule which enables the reactive material (comprising the phosphorous-containing organic material bonded to the metal oxide/hydroxide surface) to react with, attract, couple to, bond with, etc. other atoms, ions and/or molecules. Intermediate groups may be defined as the group on the molecule which permits substitution or addition of groups or compounds to the R or R' groups after the monolayer has been formed on the oxide/hydroxide particle. Examples of intermediate groups include I, Cl, Br, CN, etc. The intermediate group permits the addition of groups or radicals which would not be compatible with or be destroyed during formation of the monolayer. Thus, this permits the addition of functional groups on the end of the R or R' group after the monolayer is formed. By attachng specific functional groups, either organic or inorganic, to the R and R' groups of the phosphoric acid monoester or the phosphoric acid diester, a wide variety of absorbent selectivities and capacities are provided.

The functional groups attached to or contained within the free end can be selected from cation exchange functional groups and anion exchange functional groups such as $-HSO_3$, $-N(CH_3)_3Cl$, $-COONa$, $-NH_2$ and $-CN$, for example. The $-HSO_3$ functional group permits removal of cations such as $Cu^{+2}$, $Fe^{+2}$, $Co^{+2}$, $Cd^{+2}$, $Ca^{+2}$, $Sr^{+2}$, $Hg^{+2}$, $Pb^{+2}$, $Ba^{+2}$ and $Be^{+2}$ from aqueous media. The functional group, $-CH_2N(CH_3)_3Cl$, permits removal of anions such as $HSO_4^-$, $ClO_3^-$, $NO_3^-$, $NO_2^-$, $HPO_4^-$, formate, citrate. Other examples of functional groups that may terminate the free end of the phosphonate bonded hydrocarbon chain include the following: a carboxyl group, e.g., a carboxymethyl group, a glucose group, a monoclonal antibody, a cyano group ($-C \equiv N$), a phenyl group, a diphenyl group, a tertiary butyl group, a sulfonic group, a benzyl sulfonic group, protein groups such as protein A (staphylococcal protein A), pharmaceutical compounds, yeasts, microbes, whole cells, enzyme groups, dye molecules, chelated metal groups, tag molecules and combination of these groups. Further, it should be noted that the carbon group can be a saturated or unsaturated carbon chain.

It will be noted that the R or R' groups are always monomers or oligomers. Preferably, the oligomers have a molecular weight of less than 2000. By the use of monomer herein is meant to include a chemical compound that can undergo polymerization. By oligomer is meant a polymer or polymer intermediate containing relatively few structural units, i.e., a polymer containing 2-4 monomers.

While we do not wish to be bound by any particular theory of bonding, it is believed that when a metal oxide/hydroxide particle, for example, alumina, is brought into contact with the phosphoric acid monoester or phosphoric acid diester, a reaction or adsorption of the acid on the alumina takes place in which the aluminum and phosphorus atoms in the respective molecules are apparently bonded together through an oxygen atom as illustrated in the formulas below:

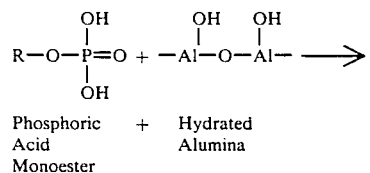

Phosphoric Acid Monoester + Hydrated Alumina

Product + Water

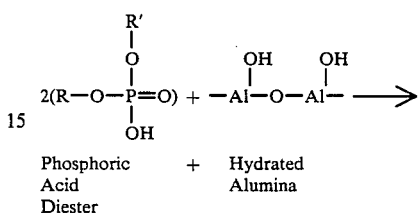

Phosphoric Acid Diester + Hydrated Alumina

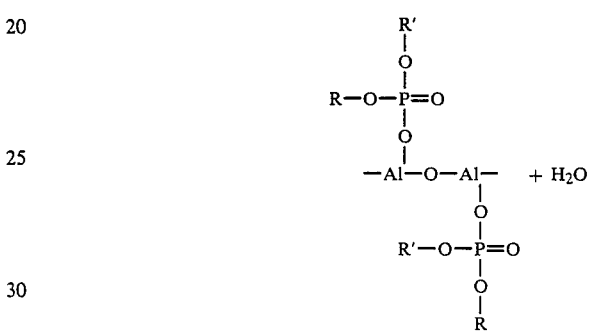

Product + Water

Note: Aluminum ions may be an octrahedrally or tetrahedrally coordinated cation with or without coordination vacancies at or near the surface (external or within pore structures).

Thus it can be seen, using the above proposed model, that if all of the exposed hydroxyl groups on the surface of the alumina can be reacted with the phosphoric acid monoester or the phosphoric acid diester groups, the surface chemistry of the reacted alumina will be changed. Furthermore, the type of organic radical attached to the phosphoric acid monoester or the phosphoric acid diester can be tailored to achieve certain types of affinities to provide selectivity in the adsorption characteristics of the product. For example, when an alumina treated with a phosphoric acid monoester or phosphoric acid diester having a dodecyl R group is used, the following type of selectivity can be achieved. For example, p-nitroaniline, methyl benzoate, phenetole, and o-xylene under chromatographic conditions can be selectively adsorbed on such a reactive material in accordance with the present invention.

The chemical bonding of the phosphoric acid monoester or phosphoric acid diester to the metal oxide/hydroxide particle, e.g. alumina particle, is illustrated in FIG. 1 wherein the center represents the alumina particle having a surface 50. The carbon-containing molecule is chemically bonded at one end to surface 50 by means of a phosphorous-oxygen-metal bond. As presently understood, it is preferred that the other or free end of the carbon-containing molecule extends away from the surface of the particle, as shown in FIG. 1. Further, it is important to control the application or bonding of the phosphoric acid monoester or phosphoric acid diester to the metal oxide/hydroxide support so as to obtain a monolayer bonded to the metal oxide/hydroxide particle as illustrated in FIG. 1.

By "monolayer" or "monomolecular layer" is meant that 90%, and preferably 98%, of the phosphoric acid monoester or phosphoric acid diester molecules are bonded to the metal oxide/hydroxide particle as a single layer of molecules. Thus, the application should be controlled so as to prevent the R or R' groups from bonding to each other to form weakly adsorbed multilayers which would then provide further hydroxyl units, i.e., —POOH units directed away from and not bonded to the surface of the metal oxide/hydroxide particles, thereby defeating the purpose of the invention, for example, when it is used for an adsorbent. The thickness of the phosphorous-containing bonded organic monolayer is in the range of 10–5000 Angstroms and preferably 20 to 500 Angstroms.

As noted earlier, while it is desired to avoid organic polymers where the chain has repeating phosphorous-containing groups which can bond to the metal oxide particle surface, oligomers having preferably a single phosphorous-bonding group are utilized. The single phosphorous-bonding group permits the oligomer to have a free end which extends away from the metal oxide particle surface. Additionally, the monomer or oligomer comprising the monolayer may have reactive sites which can permit crosslinking so as to polymerize monomers or oligomers already bonded to the surface of the metal oxide particle.

In the present invention, particularly when the end use is an adsorbent, it is preferred that the monomer or oligomer used is at least a five-carbon chain. The chain can have 20 to 30 or more carbons, as noted earlier. The longer chains preferably are used in the initial bonding or loading of the metal oxide particle with the phosphorous-containing carbon material. However, because of the pores and fissures that can be present on the metal oxide particle, particularly those having high surface area, often all the surface hydroxyl units are not reacted because of the inability of the longer chain phosphorous-containing organic material to reach or to diffuse into the pores and fissures. Thus, to inert or block remaining reactive sites, short-chain monomers or oligomers, e.g., less than 6 carbon molecules per chain, can be used. In this way, all of the reactive sites are capped or blocked. That is, for capping off the reactive sites, short-chain monomers can be used. For example, an alumina treated with a high molecular weight phosphoric acid monoester or phosphoric acid diester, e.g. an n-dodecylphosphoric acid, may be further treated with a low molecular weight phosphoric acid, e.g., methylphosphoric acid, e.g., methyphosphoric acid or a mixture of methyl phosphoric acid and dimethyl phosphoric acid, to treat any remaining unreacted alumina surface areas.

The following examples will serve to further illustrate the practice of the invention.

EXAMPLE 1

The alumina used was Woelm N 3–6, a 3–6 micrometer particle size activated alumina with a nitrogen B.E.T. surface area of of 148 m$^2$/gram. X-ray diffraction identified this as being mostly chi alumina with a trace of Bayerite.

Two twenty gram samples of this alumina were treated, one with monododecyl phosphate [$(C_{12}H_{25}O)PO(OH)_2$], the other with didodecyl phosphate [$(C_{12}H_{25}O)_2PO(OH)$]. Each sample was mixed with 92 ml. of a 0.14M toluene solution of the respective reagents for two hours at 50° C. Each reaction mixture was then vacuum filtered to separate the solids. The solids from each mixture were then washed with three displacements of fresh toluene to remove any unreacted organophosphonic acid. The samples were then dried under vacuum at 60° C. for more than 8 hours. The samples were then analyzed for carbon (by combustion) and phosphorus (by direct current plasma spectroscopy on a nitric acid solution of the material). The results are summarized in the following table.

|  | Experiment No. 22661-48A | Experiment No. 22661-48B |
| --- | --- | --- |
| Reagent | $(C_{12}H_{25}O)PO(OH)_2$ | $(C_{12}H_{25}O)_2PO(OH)$ |
| Initial Al$_2$O$_3$ wt, gm | 20.01 | 20.02 |
| Treated Al$_2$O$_3$ wt, gm | 22.98 | 22.63 |
| Product: |  |  |
| wt. % P | 1.56 | 0.87 |
| wt. % C | 7.72 | 8.38 |
| Mole Ratio, C/P | 12.8 | 24.8 |

EXAMPLE 2

The products of the first example were then treated with a mixture of monomethyl phosphoric acid [$(CH_3O)PO(OH)_2$] and dimethyl phosphoric acid [$(CH_3O)_2PO(OH)$] to react the alumina surface which was not accessible to the mono or didodecyl phosphoric acid. The mixture of methyl phosphates was dissolved in de-ionized water. The materials from Example 1 were added to 62 ml. of an approximately 0.62M solution of the methyl phosphate mixture at 40° C. The reaction was continued for two hours after the materials from Example 1 were wet by the solution. (They were wet with difficulty by the water solution, a qualitative indication that the particle surfaces were well covered with hydrocarbon groups.) The product solids were then vacuum filtered and washed with three displacements of de-ionized water. The material was dried under vacuum at 60° C. for more than eight hours.

The composition of the products are shown here.

|  | Experiment No. 22661-48A-1 | Experiment No. 22661-48B-1 |
| --- | --- | --- |
| Origin of Starting Solids | 22661-48A | 22661-48B |
| Starting Weight (gm) | 20.06 | 20.03 |
| Wt of Product Recovered (gm) | 19.80 | 20.27 |
| Product |  |  |
| wt. % P | 1.70 | 1.66 |
| wt. % C | 7.57 | 8.58 |

The proportion of phosphorus increased on both alumina samples, which is consistent with increasing the proportion of surface area covered with organophosphoric acids. Note that the increase in phosphorus content was much larger for the material treated with didodecyl phosphoric acid (2261-48B to 2261-48B-1).

Portions of each treated alumina (2261-48A-1 and 2261-48B-1) were used to peak columns for liquid chromatography. Each column was able to separate the mixture of p-nitroanaline, methyl benzoate, phentetole and o-xylene with 30 vol. % acetonitride, 30 vol. % methanol and 40 vol. % water. The column packed with material made from the monododecyl phosphate (22661-48A-1) gave 37,000 to 38,000 theoretical plates, while the column packed with material made from the didodecyl phosphate (22661-48B-1) gave from 31,000 to 32,000 theoretical plates.

The column packed with the monododecyl phosphate treated alumina (22661-48A-1) also showed superior resistance to strongly caustic solutions (water replaced by pH=10.0 carbonate buffer). It was uncharged after sixteen hours, while the column packed with alumina treated with didodecyl phosphate (2261-48B-1) failed completely before sixteen hours of operation has been achieved.

Thus the invention provides a method for forming a reactive material capable of withstanding pH ranges of 2 to 11 and nonwettable in an aqueous media by reacting metal oxide/hydroxide particles with an phosphoric acid monoester or phosphoric acid diester at a concentration of about 0.0001 to 0.5 molar until a sufficient amount of the phosphorous-containing compound has reacted with the surface of the metal oxide/hydroxide particle to form the desired monomolecular layer thereon.

Having thus described the invention, what is claimed is:

1. A process for chemically bonding a monomolecular layer of phosphoric acid ester to metal oxide/hydroxide particles comprised of alumina to form an active material having good chemical stability over a pH range of from 2 to 11 which comprises:
   (a) providing a liquid containing a phosphoric acid ester therein selected from the class consisting of:
      (i) phosphoric acid monoester having a formula $(RO)OP(OH)_2$; and
      (ii) phosphoric acid diester having a formula $(RO)(R'O)PO(OH)$;
      where R and R' are selected from the group consisting of long and short chain aliphatic hydrocarbons, aromatic hydrocarbons, carboxylic acids, aldehydes, ketones, amines, amides, thioamides, imides, lactams, anilines, pyridines, piperidines, carbohydrates, lactones, ethers, alkenes, alkynes, alcohols, nitriles, oximes, organosilicones, ureas, thioureas and combinations of these groups;
   (b) contacting said metal oxide/hydroxide particles with said liquid to chemically bond said phosphoric acid ester to substantially all of the reactive sites on said metal oxide/hydroxide to form a monomolecular layer of said organic material thereon forming said active material; and
   (c) treating said metal oxide/hydroxide particles with a washing solution after said contacting step to remove weakly adsorbed phosphoric acid ester molecules on said metal oxide/hydroxide particles to ensure that all of said molecules remaining are bonded to the hydroxyl groups on said metal oxide/hydroxide particles and not to one another to ensure formation of said monomolecular layer thereon.

2. The process of claim 1 wherein said step of providing a liquid containing a phosphoric acid ester therein further comprises maintaining a concentration of said phosphoric acid ester in said liquid from 0.1 to 0.5 molar.

3. The process of claim 1 wherein said step of contacting said metal oxide/hydroxide particles with said liquid containing said phosphoric acid ester further comprises maintaining said contact for from about 0.1 to about 20 hours.

4. The process of claim 3 wherein said step of contacting said metal oxide/hydroxide particles with said liquid containing said phosphoric acid ester further comprises maintaining said contact for from about 0.5 to about 4 hours.

5. The process of claim 1 wherein said step of contacting said metal oxide/hydroxide particles with said liquid containing said phosphoric acid ester further comprises maintaining the temperature of the reactants at about 5°–150° C. during said contacting step.

6. The process of forming said active material of claim 1 wherein said alumina comprises activated alumina having a surface area in the range of 0.1 to 600 m²/g.

7. The process of forming said active material of claim 1 wherein said alumina has a particle size in the range of 50 Angstroms to 12 mm.

8. A process for chemically bonding a monomolecular layer of phosphoric acid ester to metal oxide/hydroxide particles comprised of alumina to form an active material having good chemical stability over a pH range of from 2 to 11 which comprises:
   (a) providing a liquid containing a phosphoric acid ester therein selected from the class consisting of:
      (i) phosphoric acid monoester having a formula $(RO)OP(OH)_2$; and
      (ii) phosphoric acid diester having a formula $(RO)(R'O)PO(OH)$;
      where R and R' are selected from the group consisting of long and short chain aliphatic hydrocarbons, aromatic hydrocarbons, carboxylic acids, aldehydes, ketones, amines, amides, thioamides, imides, lactams, anilines, pyridines, piperidines, carbohydrates, lactones, ethers, alkenes, alkynes, alcohols, nitriles, oximes, organosilicones, ureas, thioureas and combinations of these groups;
   (b) maintaining said liquid containing said phosphoric acid ester at a concentration of at least 0.1 molar;
   (c) contacting said metal oxide/hydroxide particles with said liquid at a temperature of from about 25°–90° C. for a period of from at least 0.1 to about 20 hours to chemically bond said phosphoric acid ester to substantially all of the reactive sites on said metal oxide/hydroxide particles to form a monomolecular layer of said phosphoric acid ester thereon comprising said active material; and
   (d) treating said metal oxide/hydroxide particles with a washing solution after said contacting step to remove weakly adsorbed phosphoric acid ester molecules on said metal oxide/hydroxide particles to ensure that all of said molecules remaining are bonded to the hydroxyl groups on said metal oxide/hydroxide particles and not to one another to ensure formation of said monomolecular layer thereon.

9. The process of forming said active material of claim 8 wherein said metal oxide/hydroxide particles have a particle size range of from 50 Angstroms up to 12 millimeters.

10. The process of forming said active material of claim 9 wherein said particle size range of said metal oxide/hydroxide particles is from about 1 to about 200 microns.

11. The process of forming said active material of claim 8 wherein said metal oxide/hydroxide particles comprise porous particles having an average pore size of from about 20 Angstroms to about 10 microns in diameter.

12. The process of forming said active material of claim 11 wherein said porous metal oxide/hydroxide particles have a pore volume of from about 0.1 to about 1.5 ml/gram.

13. The process of forming said active material of claim 12 wherein said porous metal oxide/hydroxide particles have a surface area of from about 0.10 to about 1000 m²/gram.

14. The process of forming said active material of claim 8 wherein the thickness of said substantially monomolecular layer of phosphoric acid ester chemically bonded to said metal oxide/hydroxide particles is in the range of 10 to 5,000 Angstroms.

15. The process of forming said active material of claim 8 wherein the thickness of said monomolecular layer of phosphoric acid ester chemically bonded to said metal oxide/hydroxide particles is in the range of 20 to 500 Angstroms.

16. The process of forming said active material of claim 8 wherein said R group of said phosphoric acid ester contains at least 5 carbon atoms.

17. The process of forming said active material of claim 8 wherein the metal oxide/hydroxide particles surface is substantially free of hydroxyl groups after chemically bonding.

18. The process of forming said active material of claim 8 wherein said monomolecular layer constitutes 1 to 75 wt. % of said active material comprising said phosphoric acid ester chemically bonded to said metal oxide/hydroxide particles.

19. The process of forming said active material of claim 8 wherein said monomolecular layer constitutes about 4 to 50 wt. % of said active material comprising said phosphoric acid ester chemically bonded to said metal oxide/hydroxide particles.

20. The process of forming said active material of claim 16 comprising the further step of treating said reactive material, comprising said metal oxide/hydroxide particles having chemically bonded thereto said phosphoric acid ester containing at least 5 carbon atoms, with a second liquid having a phosphoric acid ester therein selected from the class consisting of:
  (a) phosphoric acid monoester having the formula $(RO)PO(OH)_2$; and
  (b) phosphoric acid diester having the formula $(RO)(R'O)PO(OH)$;
where R comprises a 1-5 carbon-contained group and R' comprises a 1-5 carbon-containing group; said further treatment step acting to react said phosphoric acid ester in said second liquid with any remaining surface hydroxyl groups on the surface of said metal oxide/hydroxide particle not reacted in said first treatment.

21. An active material comprising metal oxide/hydroxide particles comprised of alumina having chemically bonded to substantially all of the reactive sites on a surface thereof, a monomolecular layer of a phosphoric acid ester having a phosphorus-containing group and a carbon-containing group, said phosphoric acid ester being selected from the class consisting of:
  (a) phosphoric acid monoester having the formula $(RO)PO(OH)_2$; and
  (b) phosphoric acid diester having the formula $(RO)(R'O)PO(OH)$;
where R and R' are selected from the group consisting of long and short chain aliphatic hydrocarbons, aromatic hydrocarbons, carboxylic acids, aldehydes, ketones, amines, amides, thioamides, imides, lactams, anilines, pyridines, piperidines, carbohydrates, lactones, ethers, alkenes, alkynes, alcohols, nitriles, oximes, organosilicones, ureas, thioureas and combinations of these groups; said bond being formed by reaction of said phosphorus-containing group with said metal oxide/hydroxide surface, said carbon-containing group being oriented away from said metal oxide/hydroxide surface.

22. The active material of claim 21 wherein said metal oxide/hydroxide comprises particles having a particle size range of from 50 Angstroms up to 12 millimeters.

23. The active material of claim 22 wherein said particle size range of said metal oxide/hydroxide particles is from about 1 to about 200 microns.

24. The active material of claim 22 wherein said metal oxide/hydroxide particles comprise porous particles having an average pore size of from about 1 to about 200 microns in diameter.

25. The active material of claim 24 wherein said porous metal oxide/hydroxide particles have a pore volume of from about 0.1 to about 1.5 ml/gram.

26. The active material of claim 24 wherein said porous metal oxide/hydroxide particles have a surface area of from about 0.10 to about 1000 m²/gram.

27. The active material of claim 21 wherein said alumina comprises activated alumina having a surface area in the range of 0.1 to 600 m²/g.

28. The active material of claim 21 wherein said alumina has a particle size in the range of 50 Angstroms to 12 millimeters.

29. The active material of claim 22 wherein the thickness of said monomolecular layer of phosphoric acid ester chemically bonded to said metal oxide/hydroxide particles is in the range of 10 to 5,000 Angstroms.

30. The active material of claim 29 wherein the thickness of said monomolecular layer of phosphoric acid ester chemically bonded to said metal oxide/hydroxide particles is in the range of 20 to 500 Angstroms.

31. The active material of claim 22 wherein said R group of said phosphoric acid ester contains at least 5 carbon atoms.

32. The active material of claim 21 wherein either said R group or said R' group has a cation exchange functional group attached to a portion of said molecule spaced from said phosphorus-containing group on said molecule and selected from the class consisting of $-HSO_3$, $-N(CH_3)_3Cl$, $-COONa$, $-NH_2$ and $-CN$.

33. The active material of claim 22 wherein said monomolecular layer of organic material having a phosphoruscontaining group is substantially free of hydroxyl groups after chemically bonding to said metal oxide/hydroxide particles.

34. The active material of claim 22 wherein said monomolecular layer constitutes 1 to 50 wt. % of said reactive material comprising said phosphoric acid ester chemically bonded to said metal oxide/hydroxide particles.

35. The active material of claim 34 wherein said monomolecular layer constitutes about 4 to 12 wt. % of said reactive material comprising said phosphoric acid ester chemically bonded to said metal oxide/hydroxide particles.

36. An active material capable of reacting with, attracting, coupling to, or bonding with other atoms, ions, and/or molecules comprising:
  (a) metal oxide/hydroxide particles consisting essentially of alumina; and
  (b) chemically bonded to reactive sites on a surface of said metal oxide/hydroxide particles, a monomolecular layer of a phosphoric acid ester comprised of a phosphorus-containing group and a carbon-containing group and selected from the class consisting of phosphoric acid monoester having the formula $(RO)PO(OH)_2$ and phosphoric acid diester having the formula $(RO)(R'O)PO(OH)$ where R and R' are selected from the group consisting of long and short chain aliphatic hydrocarbons, aromatic hydrocarbons, carboxylic acids, aldehydes, ketones, amines, amides, thioamides, imides, lactams, anilines, pyridines, piperidines, carbohydrates, lactones, ethers, alkenes, alkynes, alcohols, nitriles, oximes, organosilicones, ureas, thioureas and combinations of these groups;

said bond being formed by reaction of said phosphorus-containing group with said metal oxide/hydroxide particle surface, said carbon-containing group being oriented away from said metal oxide/hydroxide particle surface.

37. The active material of claim 36 wherein said R group on said phosphoric acid ester comprises a monomer and said R' group is a monomer.

38. The active material of claim 36 wherein said R group of said phosphoric acid ester is n oligomer containing 2-4 monomers and having a molecular weight of less than 2000.

* * * * *

UNITED STATES PATENT AND TRADEMARK OFFICE
CERTIFICATE OF CORRECTION

PATENT NO. : 4,871,711

DATED : October 3, 1989

INVENTOR(S) : Edward S. Martin and Larry F. Wieserman

It is certified that error appears in the above-identified patent and that said Letters Patent is hereby corrected as shown below:

| | |
|---|---|
| "Other Publications", Second Reference | Change "Di-n-butylphosphate" to --di-n-butylphosphate--. |
| Col. 2, line 54 | Change "phosphorouscontaining" to --phosphorous-containing--. |
| Col. 6, line 30 | Change "phosphorouscontaining" to --phosphorous-containing--. |
| Claim 1 Col. 11, line 29 | Change "OP" to --PO--. |
| Claim 8 Col. 12, line 24 | Change "OP" to --PO--. |
| Claim 8 Col. 12, line 26 | Change "PO)" to --PO(--. |
| Claim 20 Col. 13, line 45 | Change "carbon-contained" to --carbon-containing--. |

UNITED STATES PATENT AND TRADEMARK OFFICE
CERTIFICATE OF CORRECTION

PATENT NO. : 4,871,711

DATED : October 3, 1989

INVENTOR(S) : Edward S. Martin and Larry F. Wieserman

It is certified that error appears in the above-identified patent and that said Letters Patent is hereby corrected as shown below:

Claim 33  
Col. 14, lines 46-47

Change "phos-phoruscontaining" to --phosphorus-containing--.

Claim 38  
Col. 16, line 10

After "is", change "n" to --an--.

Signed and Sealed this

Twenty-first Day of January, 1992

Attest:

HARRY F. MANBECK, JR.

*Attesting Officer*  *Commissioner of Patents and Trademarks*